(12) United States Patent
Suemoto et al.

(10) Patent No.: US 7,126,641 B2
(45) Date of Patent: Oct. 24, 2006

(54) SYSTEM AND METHOD FOR ADJUSTING START-UP OF A DIGITAL CAMERA

(75) Inventors: Kazunori Suemoto, Niiza (JP); Masashi Inoue, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 947 days.

(21) Appl. No.: 09/768,507

(22) Filed: Jan. 25, 2001

(65) Prior Publication Data

US 2002/0018140 A1    Feb. 14, 2002

(30) Foreign Application Priority Data

Jan. 25, 2000  (JP)  .............. 2000-016321

(51) Int. Cl.
*H04N 5/225*   (2006.01)

(52) U.S. Cl. .................................. 348/372

(58) Field of Classification Search ............... 396/277, 396/278, 279, 280, 301, 302, 303, 304, 349, 396/133, 448; 348/357, 372, 335, 347, 207.99; 702/60, 63; 320/127, 136
See application file for complete search history.

(56) References Cited

U.S. PATENT DOCUMENTS

| | | | | |
|---|---|---|---|---|
| 5,369,460 A | * | 11/1994 | Taniguchi et al. ............ | 396/80 |
| 6,014,523 A | * | 1/2000 | Oono et al. .................... | 396/48 |
| 6,233,016 B1 | * | 5/2001 | Anderson et al. ............ | 348/372 |
| 6,278,844 B1 | * | 8/2001 | Takeshita ...................... | 396/85 |
| 6,700,610 B1 | * | 3/2004 | Kijima et al. ................ | 348/296 |
| 6,980,252 B1 | * | 12/2005 | Akizuki et al. ............. | 348/372 |

* cited by examiner

*Primary Examiner*—David Ometz
*Assistant Examiner*—Justin Misleh
(74) *Attorney, Agent, or Firm*—Birch, Stewart, Kolasch & Birch, LLP

(57) ABSTRACT

The present invention provides a digital camera which can adjust the start-up time in accordance with an amount of an electric energy of a power source being used at the time. The electric energy of the power source and the type thereof are determined on the basis of a voltage value of the power source which is inputted via a bus (steps 202, 206 and 218). If it is determined that the amount of the electric energy of the power source is large, the DC motor and the stepping motor are driven simultaneously so as to reduce the start-up time. If it is determined that the amount of the electric energy of the power source is small, the DC motor and the stepping motor are sequentially driven to save the electric energy.

14 Claims, 12 Drawing Sheets

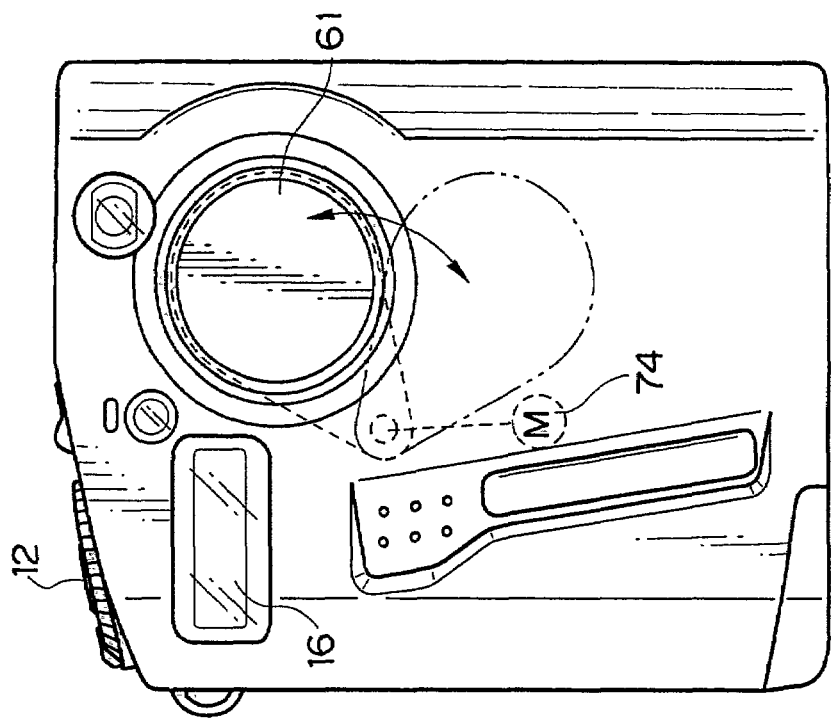
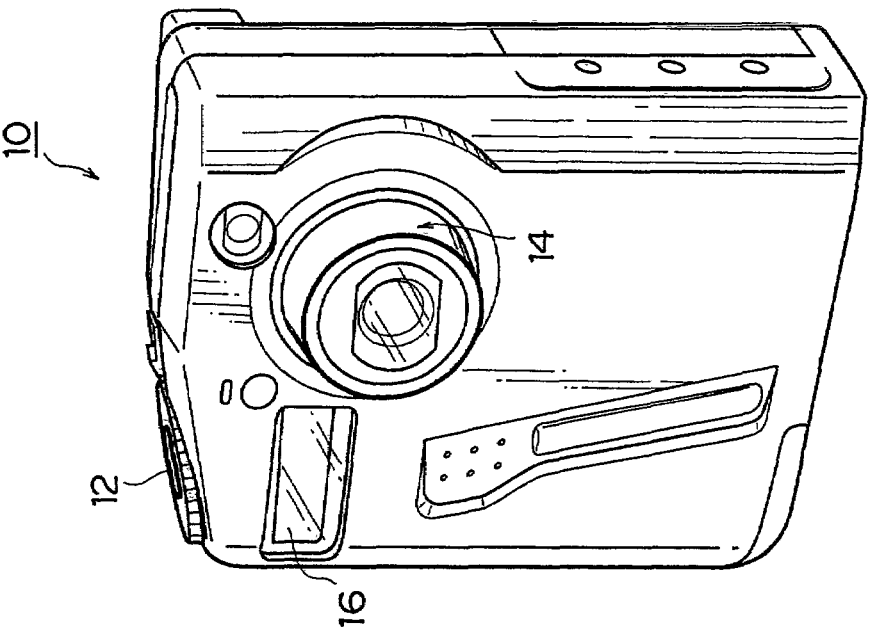

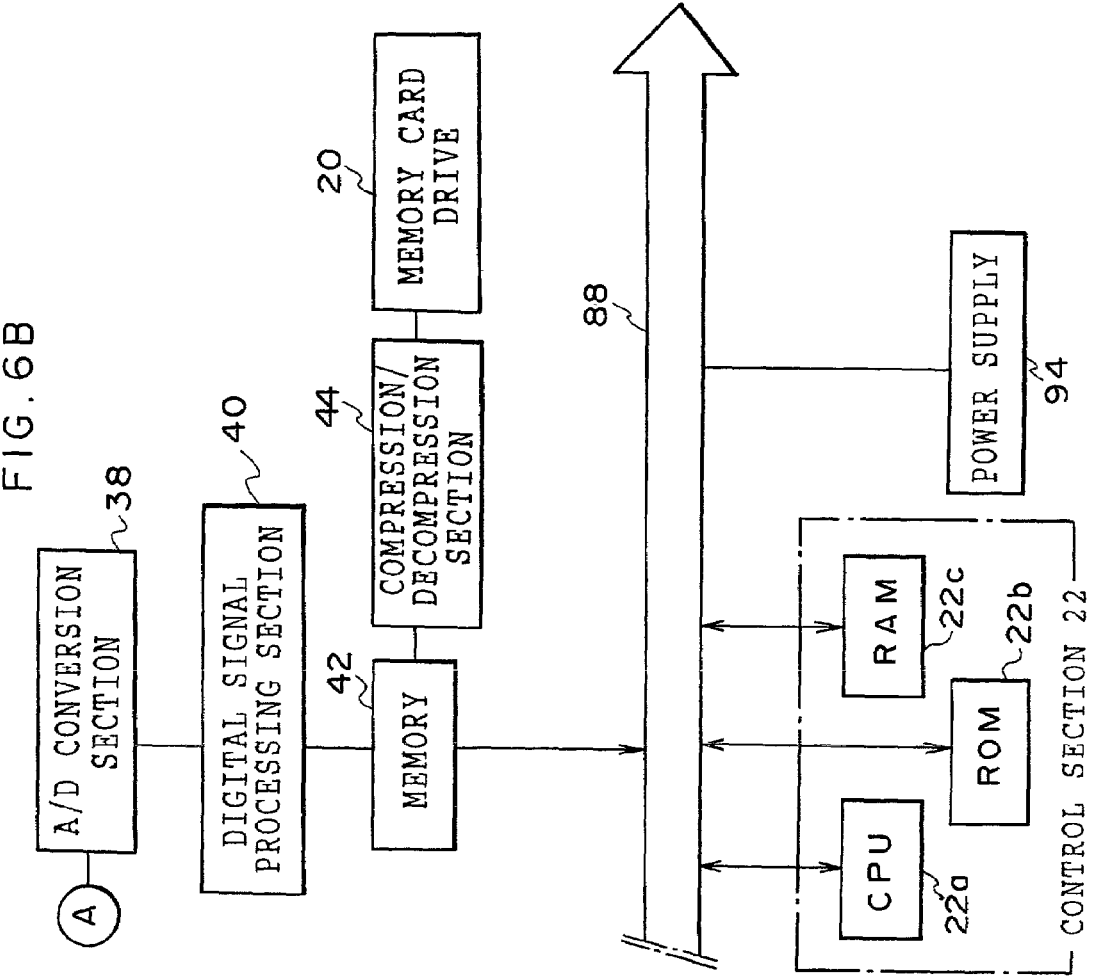

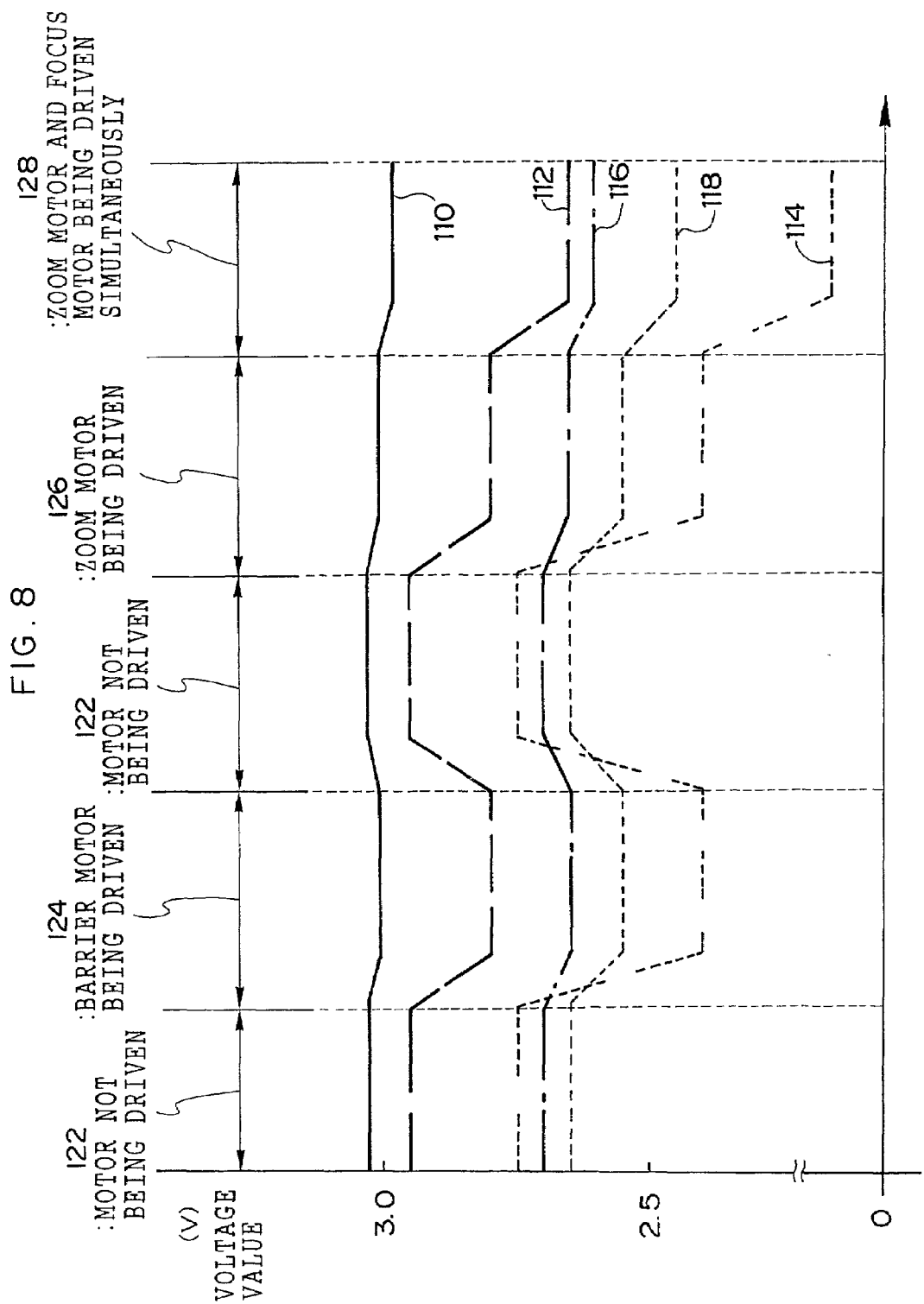

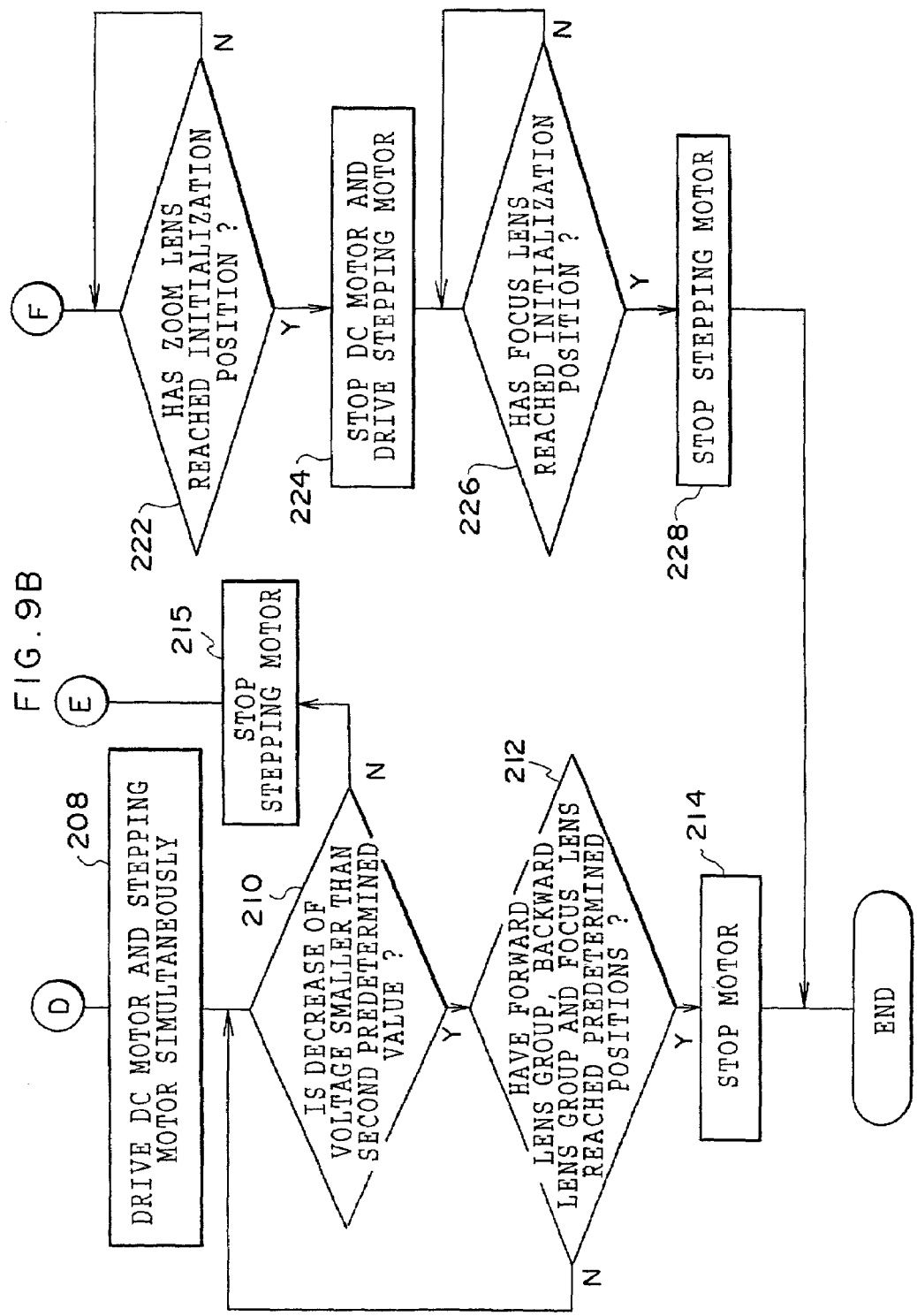

SYSTEM AND METHOD FOR ADJUSTING START-UP OF A DIGITAL CAMERA

BACKGROUND OF THE INVENTION

1. Field of the Invention

The present invention relates to a digital camera, and in particular, to a digital camera with a zoom lens.

2. Description of the Related Art

In general, a zoom lens of a zoom digital camera is formed with a plurality of lens groups. When a power source is turned off, the plurality of lens groups are accommodated all together within a lens barrel which is retracted within a housing of the digital camera. When the power source is turned on, a zoom motor is driven to extend the lens barrel to a predetermined reference position, and the zoom lens is set to be near to a wide position. Then, a focus lens in the zoom lens is moved to a focusing position within a space formed within the housing due to extension of the lens barrel, such that the digital camera is in a stand-by state in which photographing is possible.

Recently, there has been needed a digital camera in which the time from when the power source is turned on and a lens cover is opened by a motor to the time when the digital camera is in a state in which photographing is possible (which time is referred to as a startup time hereinafter) is short.

In order to make the start-up time shorter, at a time of start-up processing, it is effective for the extension of the lens barrel and movement of the focus lens to be carried out simultaneously. In order to carry out the extension of the lens barrel and the movement of the focus lens simultaneously, however, it is necessary to drive a zoom motor which extends the lens barrel and a focus motor which moves the focus lens simultaneously, and thus a large amount of electric energy is needed at a time of start-up processing.

As a result, when a weak battery or a battery with a small amount of charge is used as a power source, although there is sufficient electric energy for photographing, the electric energy is insufficient at a time of start-up processing. As a result, the start-up processing cannot be carried out and photographing becomes difficult.

SUMMARY OF THE INVENTION

With the aforementioned in view, an object of the present invention is to provide a digital camera which can adjust the start-up time in accordance with an amount of electric energy of a power source which is being used at the time.

In order to accomplish the above-described object, in accordance with a first aspect of the present invention, there is provided a digital camera comprising: (a) a housing having a lens barrel movable along an optical axis; (b) a zoom lens group and a focus lens group movable relative to one another along the optical axis in the lens barrel; (c) a zoom motor connected to the lens barrel operable for moving the lens barrel to a position corresponding to a selected magnification; (d) a focus motor connected to the focus lens group operable for moving the focus lens group to a focus position corresponding to the selected magnification; (e) a lens cover movable between closed and open positions for protecting at least one lens, and a lens cover driving motor connected to the lens cover, operable for moving the lens cover between closed and open positions; (f) an electric power source; (g) a controller connected to the electric power source and controlling the zoom motor and the focus motor, the controller determining during power initiation whether a voltage decrease from the electric power source during operation of one of the lens cover driving motor and the zoom motor is less than a predetermined value, and if so, controlling the zoom motor and the focus motor to substantially overlap in operation to move the lens groups to initialization positions; and (h) an image sensor supported in the housing for receiving light through the lens groups, and operable for producing data in correspondence with light received through the lens groups for image recording.

In accordance with the first aspect of the present invention, at a time of initialization, on the basis of the amount by which voltage decreases when either a lens cover driving motor or a zoom motor is driven, driving of the zoom motor and the focus motor is controlled.

That is, when the amount by which the voltage decreases is smaller than a predetermined value, a power source with a large electric energy is used, thus the drive controller drives the zoom motor and the focus motor simultaneously. Therefore, the start-up time which is the time from when a lens cover is opened until a digital camera is in a state in which photographing is possible can be reduced.

When the zoom motor and the focus motor are driven simultaneously, for example, the zoom motor is driven stepwise such that the zoom lens group moves stepwise every fixed period of time or every fixed period. Further, the focus motor can be driven such that the focus lens group moves stepwise following the movement of the zoom lens group.

In a case of a digital camera in which a lens cover is opened/closed by the lens cover driving motor, the amount by which the voltage decreases is the same amount by which the voltage decreases when either the lens cover driving motor or the zoom motor is driven. In a case of a digital camera with which the lens cover driving motor is not provided and in which a lens cover is manually opened or closed, the amount by which the voltage decreases is the amount by which the voltage decreases when the zoom motor is driven.

"Simultaneous driving of the zoom motor and the focus motor" described herein is not limited to a state in which both the zoom motor and the focus motor are simultaneously driven (i.e., both are started at the same time and stopped at the same time) and includes at least a state in which the zoom motor and the focus motor are driven simultaneously. For example, there may be included a case in which the driving of focus motor is started after a constant period of time has passed since the driving of zoom motor is started, a case in which the driving of the zoom motor starts after a constant period of time passes since the driving of focus motor starts and a case in which during driving of the zoom motor and the focus motor, either the zoom motor or the focus motor is stopped temporarily and after a fixed period of time passes, the driving of the stopped one is started again.

When the amount by which the voltage decreases is larger than a predetermined value, since a power source with less electric energy is being used, in a second aspect of the present invention, the controller drives one of the zoom motor and the focus motor to move one of the zoom lens group and the focus lens group to an initialization position, and then drives the other motor to move the other lens group to an initialization position.

That is, when a power source having little electric energy is used, since a large amount of electric power cannot be supplied at one time, either the zoom motor or the focus motor is driven. Thus a large amount of electric power needs not be supplied at one time and it is possible to prevent photographing from becoming difficult due to a decrease in the electric power. There is no waste of a battery such as a case in which although the electric power is sufficient for photographing, it is insufficient for driving the zoom lens such that photographing becomes difficult and the battery needs to be replaced. As a result, the battery can be used efficiently.

Any of the zoom motor and the focus motor may be driven first when the amount by which the voltage decreases is larger than the predetermined value. In accordance with a third aspect of the present invention, it is preferably controlled such that the zoom motor is driven first and then the focus motor is driven. Because of the above-described control, mechanical drawbacks such as a case in which a space formed due to movement of the zoom lens is so small that the focus lens cannot be moved to a predetermined position and the like can be prevented.

In accordance with a fourth aspect of the present invention, there is provided a digital camera comprising: (a) a housing having a lens barrel movable along an optical axis; (b) a zoom lens group and a focus lens group movable relative to one another along the optical axis in the lens barrel; (c) a zoom motor connected to the lens barrel operable for moving the lens barrel to a position corresponding to a selected magnification; (d) a focus motor connected to the focus lens group operable for moving the focus lens group to a focus position corresponding to the selected magnification; (e) a lens cover movable between closed and open positions for protecting at least one lens, and a lens cover driving motor connected to the lens cover, operable for moving the lens cover between closed and open positions; (f) an internal electric power source connectable to an AC power source; (g) a controller connected to the internal electric power source, and controlling the zoom motor and the focus motor, the controller controlling the zoom motor and the focus motor to substantially overlap in operation upon power initiation to move the lens groups to initialization positions if the internal electric power source is connected to an AC power source; and (h) an image sensor supported in the housing for receiving light through the lens groups, the image sensor being operable for producing data in correspondence with light received through the lens group for image recording.

That is, when the alternating power source is connected, even if the zoom motor and the focus motor are driven simultaneously, there is no lack of the electric energy. Therefore, in accordance with the fourth aspect of the present invention, a determination is made as to whether the alternating power source is connected and if it is determined that the alternating power source is connected, it is controlled such that the zoom motor and the focus motor to be driven simultaneously. In this way, the start-up time until the digital camera is in a state in which photographing is possible can be reduced.

Whether or not the alternating power source is connected is determined by, for example, a detector in which when a socket of the alternating power source is inserted, an amount of electric power supplied thereto (the amount by which it is energized) changes so that whether or not the socket of the alternating power source is inserted is detected. Alternatively, it may be structured such that a user can manually give instructions as to whether or not the alternating power source is connected and a determination is made on the basis of the instructions. In accordance with a fifth aspect of the present invention, a determination is also made as to whether or not the alternating power source is connected on the basis of a power source voltage value at a time when the camera is energized and an amount by which the voltage decreases when either the lens cover driving motor or the zoom motor is driven.

That is, because the power source voltage value of the alternating power source at a time of energizing is higher than that of a storage battery and the amount by which the voltage decreases is smaller than the predetermined value, a determination as to whether or not the alternating power source is connected can be made on the basis of the voltage value at a time of energizing and the amount by which the voltage decreases.

In accordance with a sixth aspect of the present invention, in the digital camera according to the first aspect through the fifth aspect, the controller includes a clock, the controller determining electric energy availability of the power source on the basis of at least one of a power source voltage value during power initiation and the voltage decrease when one of the lens cover driving motor and the zoom motor is driven, and when the electric energy energy availability is less than a predetermined amount, sets a lower clock frequency for the clock. That is, by lowering the clock frequency to one lower than the standard clock frequency, a clock rate becomes slow, thus electric energy consumption can be decreased. Therefore, there is no waste of the battery such as a case in which although the electric power is sufficient for photographing, it is insufficient for driving the zoom lens such that photographing becomes difficult and a battery needs to be replaced. As a result, the battery can be used efficiently.

In accordance with a seventh aspect of the present invention, the controller determines whether or not an AC power source is connected to the internal power source, on the basis of a power source voltage value during power initiation and a voltage decrease when one of the lens cover driving motor and the zoom motor is operated. That is, by making the clock frequency lower than the standard clock frequency, a clock rate becomes slow, thus electric energy consumption can be decreased. Therefore, there is no waste of the battery such as a case in which although the electric power is sufficient for photographing, it is insufficient for driving the zoom lens such that a photographing becomes difficult and a battery needs to be replaced. As a result, the battery can be used efficiently.

BRIEF DESCRIPTION OF THE DRAWINGS

FIG. 1A is a perspective view of an exterior of a digital camera relating to a first embodiment of the present invention.

FIG. 1B is a front view showing the exterior of the digital camera relating to the first embodiment of the present invention in a state in which a lens is accommodated when a power source is turned off.

FIGS. 6A and 6B are block diagrams of the digital camera of the first embodiment.

FIG. 8 is a graph showing changes in voltage when an alternating power source, an alkaline battery, an alkaline battery with a small amount of charge, an NiMH battery and an NiMH battery with a small amount of charge are used as a power source of the digital camera of the first embodiment.

FIGS. 9A and 9B are flowcharts of drive control of the zoom motor and the focus motor relating to a second embodiment of the present invention.

DESCRIPTION OF THE PREFERRED EMBODIMENTS

First Embodiment

Figure 2:
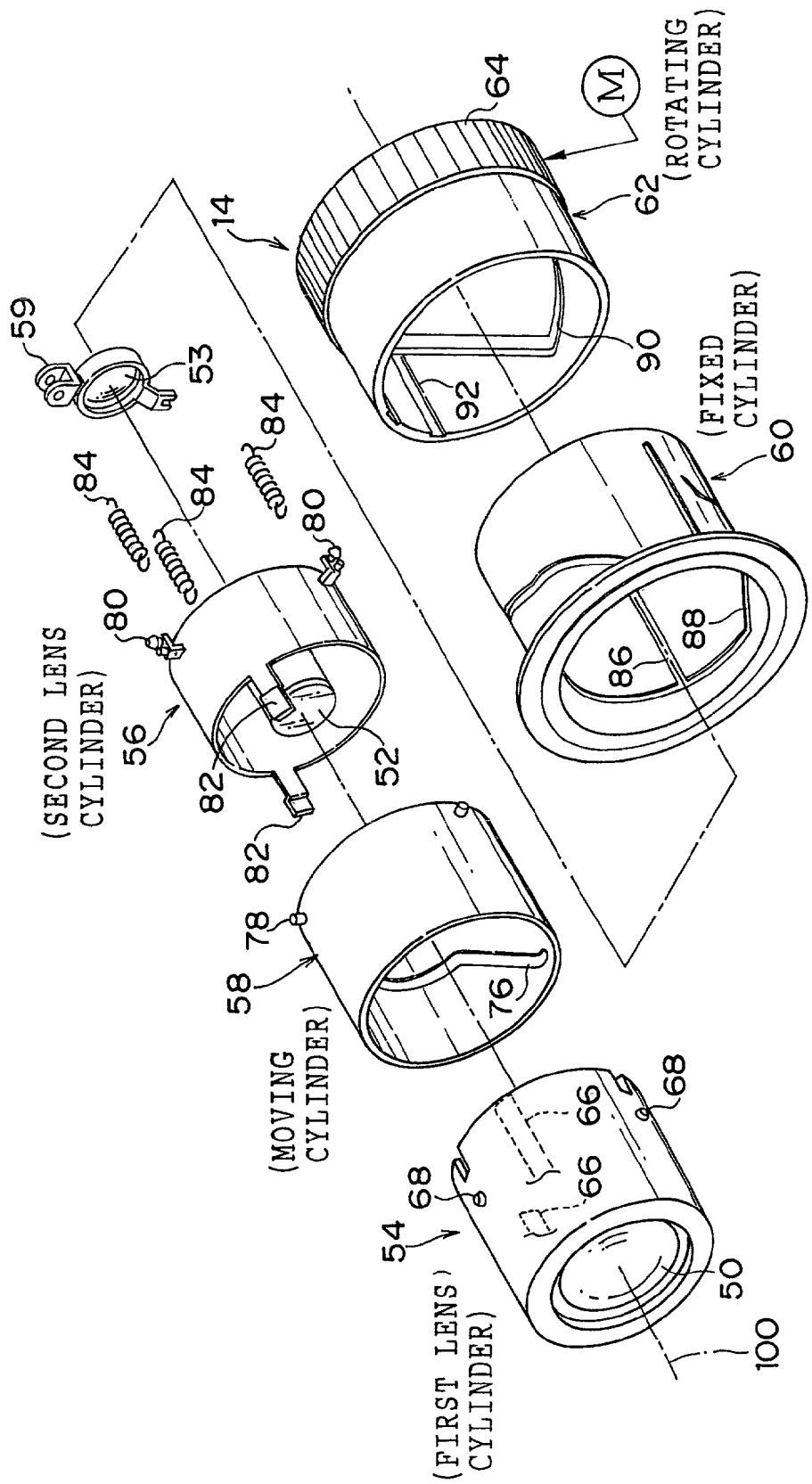
FIG. 2 is an exploded perspective view of lenses of the digital camera shown in FIGS. 1A and 1B.

Hereinafter, a first embodiment of the present invention will be described in detail with reference to the drawings. A digital camera 10 to which the present invention is applied is formed of, as shown in FIGS. 1A and 1B, a photographing device 30 (see FIGS. 3 through 5) including a shutter button 12, a zoom lens 14 (details thereof will be described later) and a CCD and the like, a flash 16, a memory card drive 20 (see FIG. 6) and a control section 22 which controls the driving of these components (see FIG. 6) and the like.

The zoom lens 14 is formed by, as shown in FIGS. 2 through 5, a forward lens group 50, a backward lens group 52 a focus lens 53, a first lens cylinder 54, a moving cylinder 58, a second lens cylinder 56, a fixed cylinder 60 and a rotating cylinder 62.

A gear portion 64 is formed at an outer circumferential surface of the rotating cylinder 62 at a camera main body side thereof. The driving force of a DC motor 70 (see FIG. 3) which is a zoom motor is transmitted to the gear portion 64, thereby the rotating cylinder 62 rotates while contacting the outer circumferential surface of the fixed cylinder 60. A second lens cam unit 90 and a straight advancing guide groove 92 for a moving cylinder are formed at an inner circumferential surface of the rotating cylinder 62. The second lens cam unit 90 moves the second lens cylinder 56 to be described later in a direction of optical axis 100. The straight advancing guide groove 92 for a moving cylinder applies rotational drive of the rotating cylinder 62 to the moving cylinder 58 to be described later and allows forward and backward movements of the moving cylinder 58 along the optical axis 100.

A straight advancing guide opening 86 for second lens which guides the second lens cylinder 56 so that it can go straight in a direction of optical axis 100 and a moving cylinder cam 88 which moves the moving cylinder 58 in the direction of optical axis 100 are formed at an inner circumferential surface of the fixed cylinder 60.

The second lens cylinder 56 has the backward lens group 52 and the focus lens 53 therein. The backward lens 52 is held by a second lens frame 57 provided within the second lens cylinder 56 (see FIGS. 3 through 5).

The second lens frame 57 is provided with a stepping motor 72 which is a focus motor. Driving of the stepping motor 72 is transmitted via a feed screw 65 to a focus lens frame 59 (see FIGS. 3 through 5).

The focus lens frame 59 is movable along the optical axis by a guide pin 63 and the feed screw 65 which are provided at the second lens frame 57. The focus lens frame 59 moves in the direction of optical axis 100 in accordance with a lead of the feed screw 65 which rotates in accordance with a drive amount of the stepping motor 72. The focus lens frame 59 moves between an original position which is nearest to an imaging surface side with respect to the second lens cylinder 56 and a position which is apart from the original position toward a subject side. Driving of the stepping motor 72 will be described later.

A plurality of second lens cam follower units 80 and a plurality of straight advancing guide protrusions 82 (FIG. 2) are provided at the outer circumferential surface of the second lens cylinder 56. The second lens cam follower units 80 engage with the second lens cam unit 90 provided at the rotating cylinder 62 and the straight advancing guide opening 86 for second lens provided at the fixed cylinder 60. The straight advancing guide protrusions 82 engage with straight advancing guide grooves 66 of the first lens cylinder 54 to be described later. Accordingly, due to rotation of the rotating cylinder 62, the second lens cylinder 56 moves straight in the direction of optical axis 100 with respect to the fixed cylinder 60.

A plurality of springs 84 are provided between the second lens cylinder 56 and the fixed cylinder 60 (see FIG. 2). The second lens cylinder 56 is continuously urged to an imaging surface side of a photographing device by the springs 84.

The moving cylinder 58 is provided with a first lens cam 76 and a plurality of moving cylinder cam followers 78. The first lens cam 76 engages with first lens cam followers 68 which will be described later. The moving cylinder cam followers 78 engage with the moving cylinder cam 88 of the above-described fixed cylinder 60 and the straight advancing guide groove 92 of the above-described rotating cylinder 62.

The first lens cylinder 54 holds the forward lens group 50 therein by a lens holding frame which is provided within an opening end of the first lens cylinder 54. A plurality of straight advancing guide grooves 66 are formed at an inner circumferential surface of the first lens cylinder 54. A plurality of first lens cam followers 68 are provided at an outer circumferential surface of the first lens cylinder 54. The straight advancing guide grooves 66 engage with the above-described straight advancing guides of the second lens cylinder 56. The first lens cam followers 68 engage with the first lens cam 76.

That is, the moving cylinder 58 moves along the optical axis 100 in accordance with rotation of the above-described rotating cylinder 62. In accordance with the movement of the moving cylinder 58, the straight advancing guide protrusions 82 of the second lens cylinder 56 move within the straight advancing guide grooves 66. At the same time, the first lens cam 76 of the moving cylinder 58 acts such that the first lens cylinder 54 moves straight along the optical axis 100 with respect to the moving cylinder 58.

The first lens cam followers 68, the moving cylinder cam followers 78, the second lens cam follower units 80, the straight advancing guide opening 86 for second lens, the straight advancing guide grooves 92 for moving cylinder and the springs 84 are respectively provided at positions which divide a circumference of a circle about the optical axis 100 into three areas.

Figure 3:
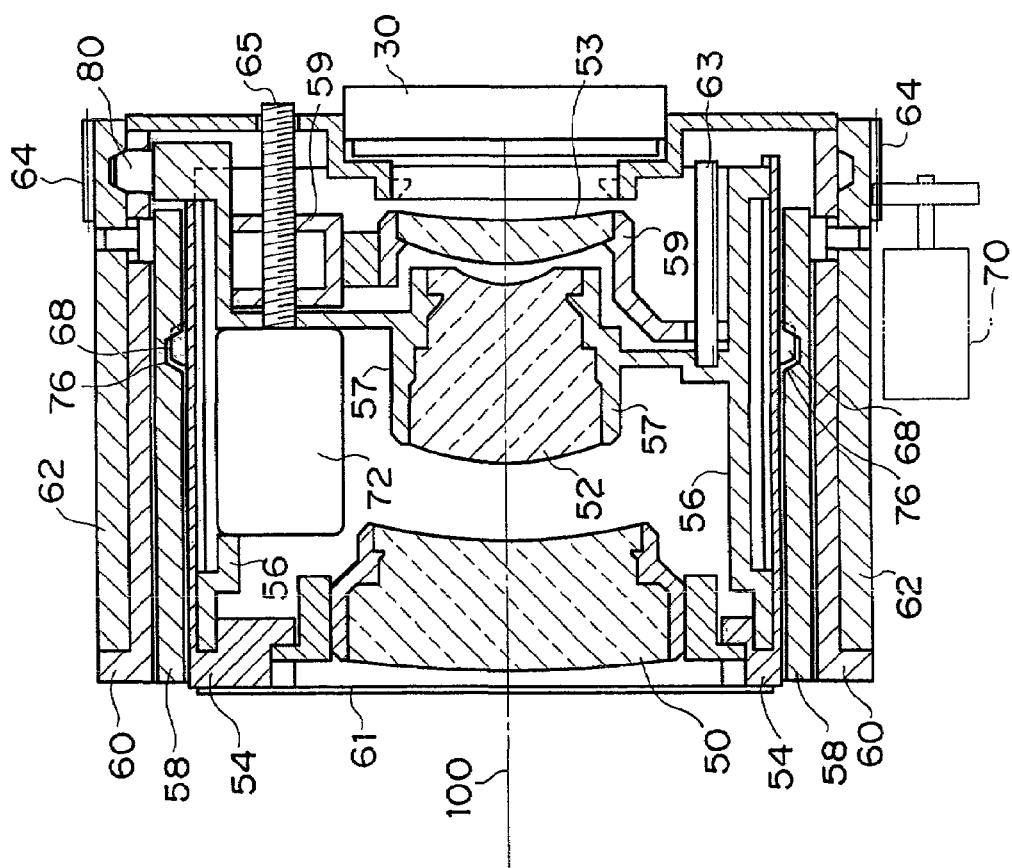
FIG. 3 is a cross-sectional view showing retraction positions of the lenses in the digital camera shown in FIGS. 1A and 1B.

When a power source is turned off, as shown in FIG. 3, the first lens cylinder 54, the moving cylinder 58, the second lens cylinder 56, the fixed cylinder 60 and the rotating cylinder 62 are retracted within a housing of the digital camera 10. The forward lens group 50, the backward lens group 52 and the focus lens 53 are accommodated within the retracted cylinders so as to be close with each other. A front surface of the forward lens group 50 is covered with a lens cover 61 which can open/close (see FIG. 1B).

The lens cover 61 is opened or closed by a lens cover motor 74. Driving of the lens cover motor 74 is controlled by a control section 22 (see FIGS. 6A and 6B). That is, the lens cover motor 74 is controlled by the control section 22 such that the lens cover 61 is opened when the power source is turned on. Moreover, the lens cover motor 74 is driven by the control section 22 such that when the power source is turned off, the zoom lens 14 is accommodated within the digital camera 10 so as to be retracted therein and then the lens cover 61 is closed.

Figure 6A:
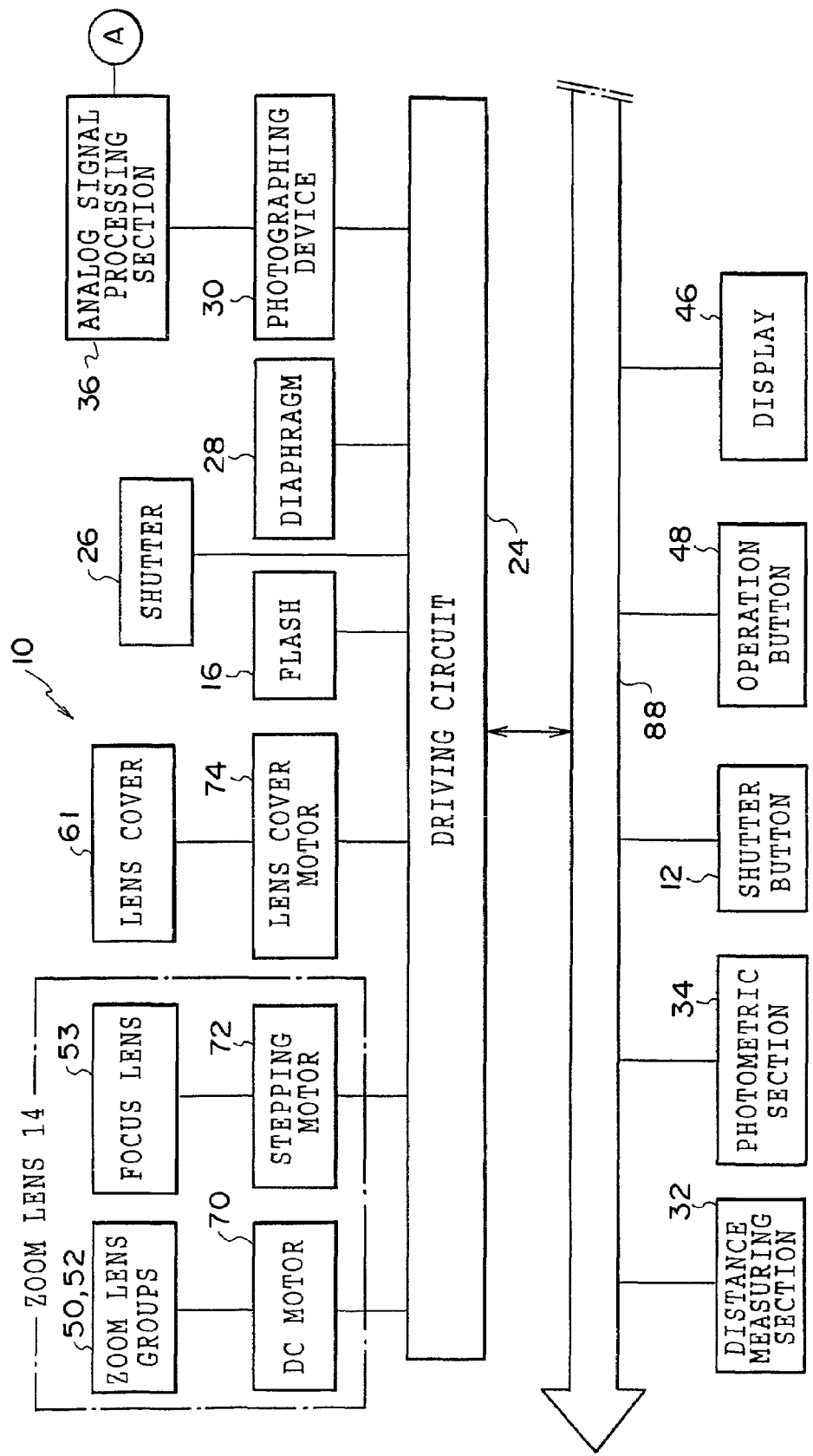

As shown in FIGS. 6A and 6B, the control section 22 is formed of a CPU 22a, a ROM 22b and a RAM 22c. Connected via a bus 88 to the control section 22 are a shutter button 12, a memory card drive 20, a driving circuit 24, a distance measuring section 32, a photometric section 34, a memory 42, a compression/decompression section 44, a display 46 and an operation button 48.

A voltage value of a power source 94 inputted via the bus 88 is temporarily stored in the RAM 22c. A program for controlling the above-mentioned various types of components connected to the control section 22 is stored in the ROM 22b. Further, also stored in the ROM 22b is a program to be described later which determines an amount of electric energy of the power source and the type thereof based on the voltage value of the power source 94 stored in the RAM 22c so as to control driving of the DC motor 70 and the stepping motor 72.

The CPU 22a reads out various types of programs from the ROM 22b so as to control respective components. Further, the CPU 22a reads the program for controlling the driving of the DC motor 70 and the stepping motor 72 from the ROM 22b. Then, the CPU 22a determines the type of the power source which is being used from the voltage value of the power source 94 stored in the RAM 22c so as to set the DC motor 70 and the stepping motor 72 to be driven simultaneously or sequentially.

For example, the CPU 22a determines an automatic focusing (AF) control value on the basis of a distance to a subject which is measured in the distance measuring section 32 to output the resultant AF control value to the driving circuit 24. Then, the driving circuit 24 drives the stepping motor 72 in accordance with the AF control value to move the focus lens 53 such that focus adjustment is automatically carried out.

At the photometric section 34, the CPU 22a determines exposure control values such as a diaphragm value (an amount of opening of diaphragm), a shutter speed, whether or not light is emitted by the flash 16 and the like to output results to the driving circuit 24. If the shutter button 12 is pressed downward, the driving circuit 24 drives the shutter 26, the diaphragm 28, the flash 16 and the photographing device 30 on the basis of the exposure control values such that a subject image transmitted through the forward lens group 50, the backward lens group 52 and the focus lens 53 is photographed.

Further, the CPU 22a drives the DC motor 70 in accordance with a selected magnification and moves the forward lens group 50 and the backward lens group 52 to respective positions corresponding to the selected magnification.

In the first embodiment, there are two methods for moving the focus lens 53 at a time of start-up. One method is to move the focus lens 53 at the same time when the forward lens group 50 and the backward lens group 52 are moved. Another method is to move the focus lens 53 after the forward lens group 50 and the backward lens group 52 have moved (i.e., after a lens barrel has been extended to an initialization position). The CPU 22a selects a start-up method on the basis of the program for controlling the driving of the DC motor 70 and the stepping motor 72, which program is read from the ROM 22b, and controls the DC motor 70 and the stepping motor 72. Control of the DC motor 70 and the stepping motor 72 by the CPU 22a at the time of start-up will be described later.

Connected to the driving circuit 24 which is connected via the bus 88 to the control section 22 are the flash 16, the shutter 26, the diaphragm 28, the photographing device 30, the DC motor 70, the stepping motor 72 and the lens cover motor 74. The photographing device 30 includes, for example, a photographing element such as a CCD or the like.

Electric charges corresponding to an amount of light entered in accordance with the exposure control value are accumulated in the photographing device 30. Accumulated electric charges, i.e., an image signal is outputted to an analog signal processing section 36.

The analog signal processing section 36 carries out a predetermined analog signal processing (for example, a noise reduction processing) on the inputted image signal to output the resultant signal to an A/D conversion section 38. In the A/D conversion section 38, the inputted analog signal is converted into a digital signal and the resultant digital signal is outputted to a digital signal processing section 40. The digital signal processing section 40 carries out a predetermined digital signal processing (for example, a shading correction processing) on the inputted digital signal to output image data to the memory 42. An image of the image data outputted to the memory 42 is displayed on the display 46.

In the digital camera 10, an image photographed by carrying out a predetermined operation with the operation button 48 can be stored in a memory card such as a smart media, a floppy disc or the like. In this case, image data stored in the memory 42 is outputted to the compression/decompression section 44. In the compression/decompression section 44, a predetermined image compression processing (for example, a JPEG compression processing) is carried out. The compressed image data is outputted to the memory card drive 20 and then written in the memory card.

In the digital camera 10, the compressed image data stored in the memory card can also be read out. In this case, the compressed image data read from the memory card is outputted to the compression/decompression section 44 and is subjected to decompression processing in the compression/decompression section 44. In this way, the compressed image is converted into an original image. The decompressed image is displayed on the display 46.

The digital camera 10 can not only photograph an image at a predetermined point of time but also continuously display an image of a subject which is being photographed like a video camera (which will be referred to as a movie mode hereinafter).

A determination as to whether or not a photographed image can be visually confirmed is carried out by, for example, determining whether or not a light amount measured in the photometric section 34 is at least a predetermined value. Also, whether or not an amount of electric charges accumulated in the CCD of the photographing device 30 is at least a predetermined value can be determined.

Basically, respective components of the digital camera 10 are operated by electricity being supplied thereto from a main power source which is not shown (for example, an NiMH battery or an alkaline battery). If the main power source is turned off, electricity is supplied by a sub power source (for example, a lithium battery) so as to suppress the consumption of power from the main power source.

In FIG. 8, there are shown a voltage change 122 when the power source 94 is turned off, a voltage change 124 when the lens cover motor 74 is driven, a voltage change 126 when only the DC motor 70 is driven, a voltage change 128 when the DC motor 70 and the stepping motor 72 are simultaneously driven, using an alternating power source (a power source with large electric energy) 110, a fully-charged alkaline battery (a power source with small electric energy) 112, an alkaline battery with a small amount of charge (a power source with small electric energy) 114, a fully-charged NiMH battery (a power source with large electric energy) 116 and an NiMH battery with a small amount of charge (a power source with small electric energy) 118.

Voltage values and amounts by which the voltage decreases described herein are only examples and the present invention is not limited to these values.

Figure 7A:
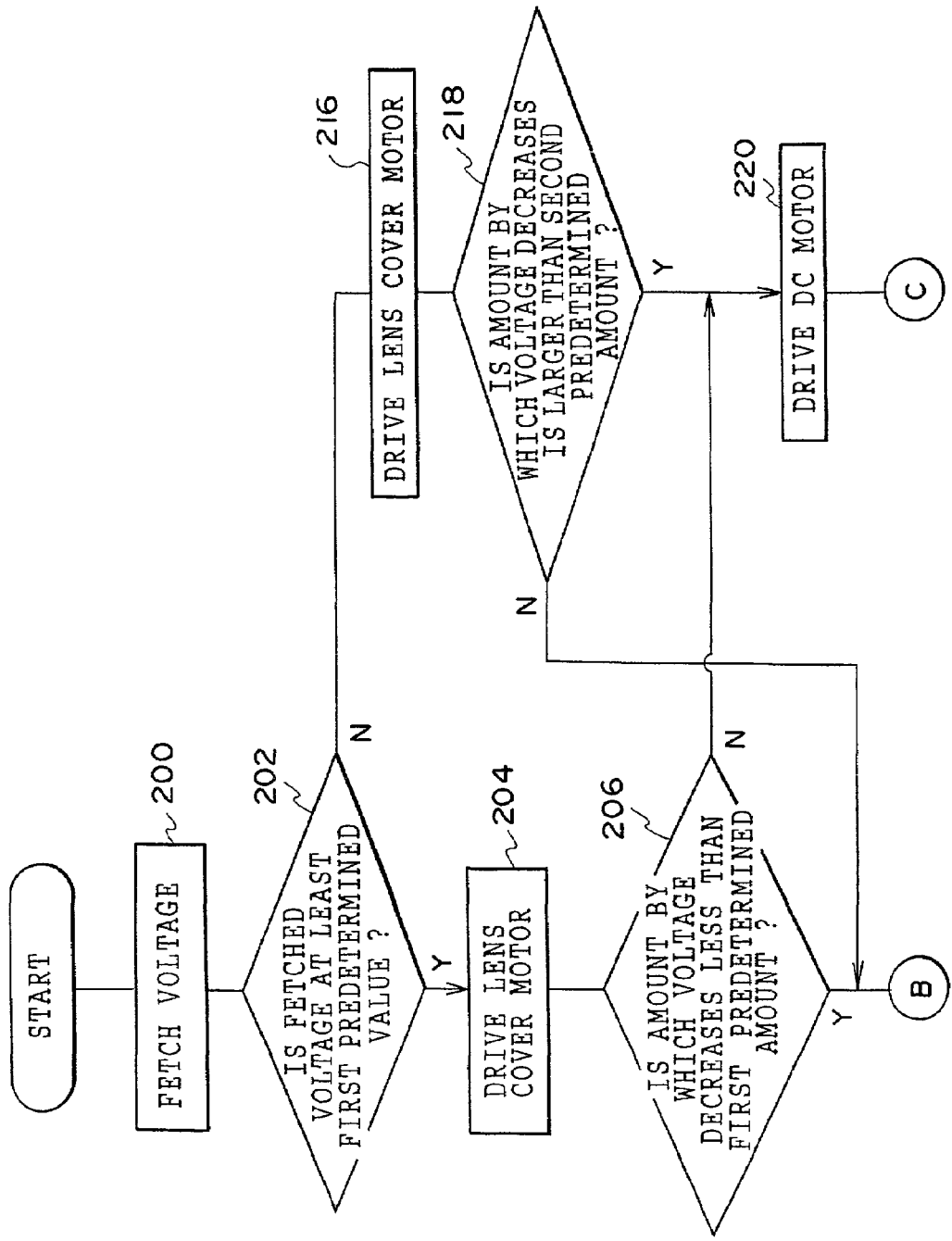
FIGS. 7A and 7B are flowcharts of drive control of a zoom motor and a focus motor.
Figure 7B:
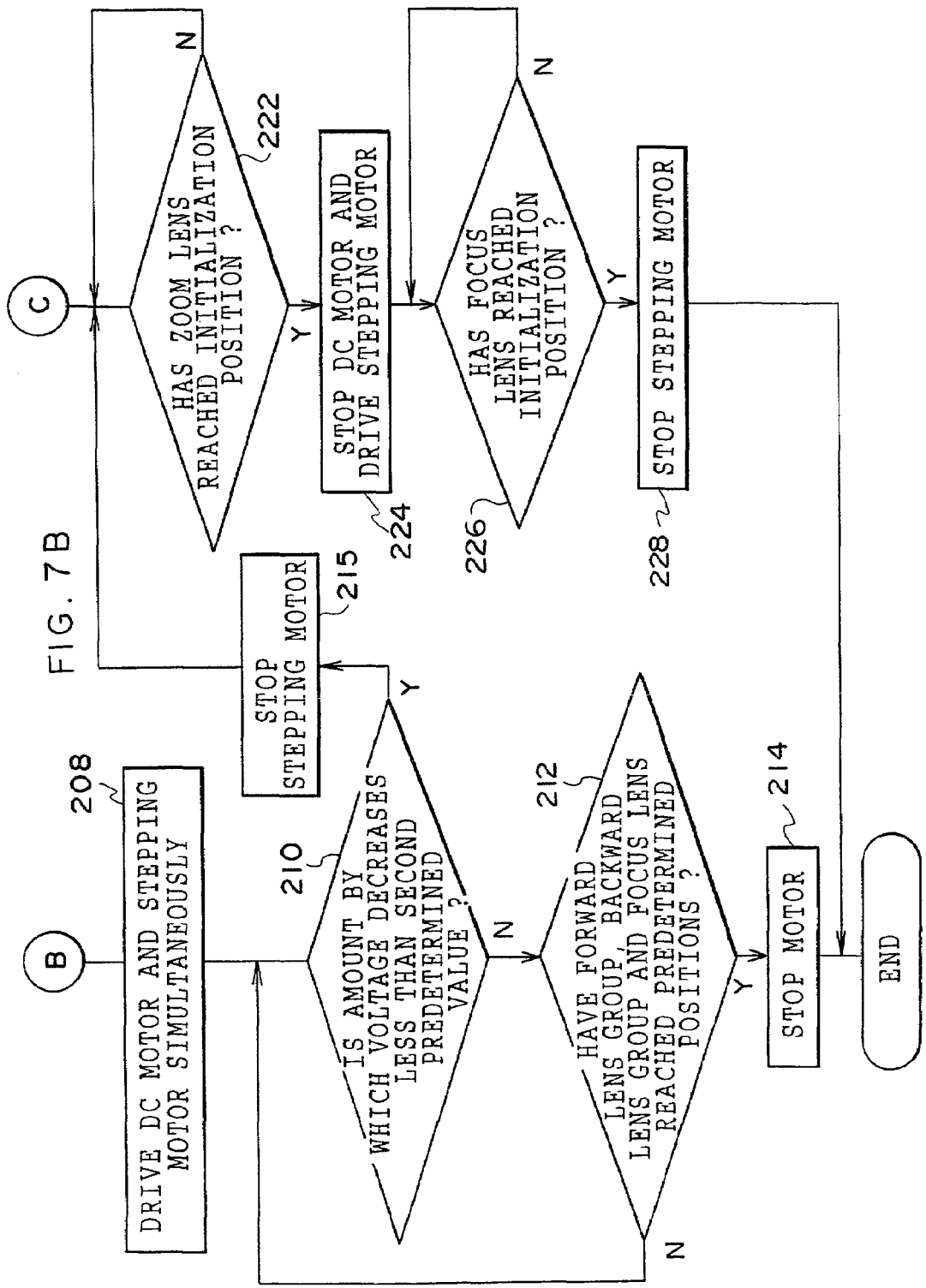

A description will be given of control by the CPU 22a at a time of start-up with reference to flowcharts of FIGS. 7A and 7B. In the zoom lens 14 in a retracted state before the power source is turned on, as shown in FIG. 3, the forward lens group 50, the backward lens group 52 and the focus lens 53 are close to each other and are respectively disposed at their accommodated positions nearest to the imaging surface side of the photographing device 30.

When the power source 94 is turned on, in step 200, a power source voltage is fetched. Then, the process proceeds to step 202. In step 202, a determination is made as to whether the fetched power source voltage value is larger than or equal to a first predetermined value. That is, if the power source is the alternating power source 110 or the fully-charged NiMH battery 112, it is determined that the power source voltage value is larger than or equal to the first predetermined value. If the power source is the fully-charged alkaline battery 116, the alkaline battery 114 with a small amount of charge or the NiMH battery 118 with a small amount of charge, it is determined that the power source voltage value is less than the first predetermined value. The first predetermined value is 2.9 V as understood from FIG. 8, but is not limited thereto.

If the power source voltage value is at least the first predetermined value, the power source voltage is either the alternating power source 110 or the fully-charged NiMH battery 112. Then, the process proceeds to step 204 and in step 204, the lens cover motor 74 is driven to open the lens cover 61. In step 206, an amount by which the voltage decreases at that time, i.e., an amount by which the voltage decreases from a power source terminal voltage value when the power source is turned on is less than or equal to a first predetermined amount. The first predetermined amount is an amount by which the alternating power source and the fully-charged alkaline battery can be distinguished, and is preferably 0.1 V from FIG. 8, but is not limited thereto.

If the amount by which the voltage decreases is less than or equal to the first predetermined amount, it is determined from FIG. 8 that the power source being used is an alternating power source with a large amount of electric energy. In step 208, the DC motor 70 and the stepping motor 72 are driven simultaneously.

That is, the lens barrel is extended and the zoom lens is moved due to driving of the DC motor 70 such that a space is formed within the digital camera 10. The stepping motor 72 is driven substantially simultaneously with the formation of the space such that the focus lens 53 is moved to a focusing position within the space.

Figure 4:
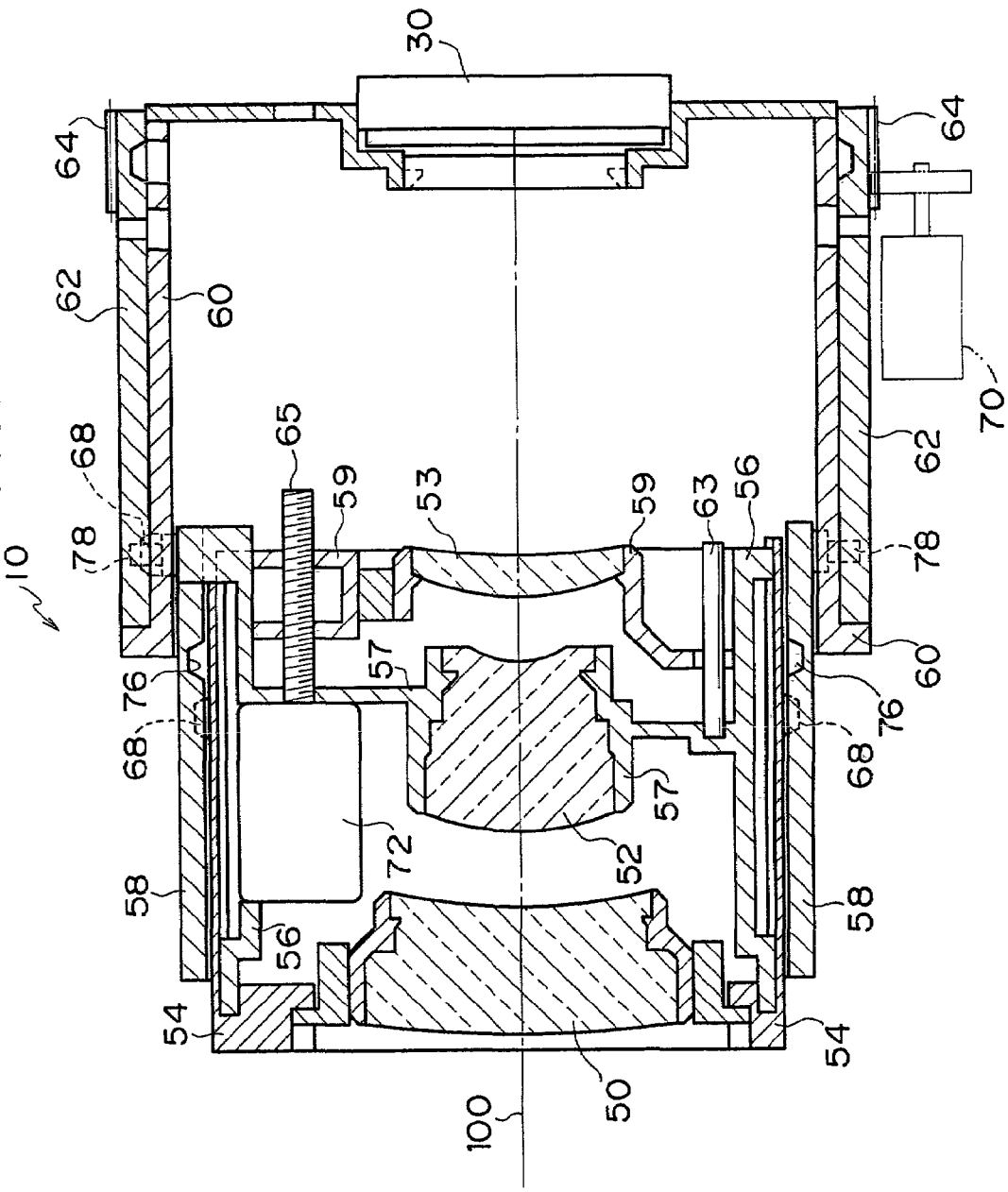
FIG. 4 is a cross-sectional view showing tele positions of the lenses in the digital camera shown in FIGS. 1A and 1B.
Figure 5:
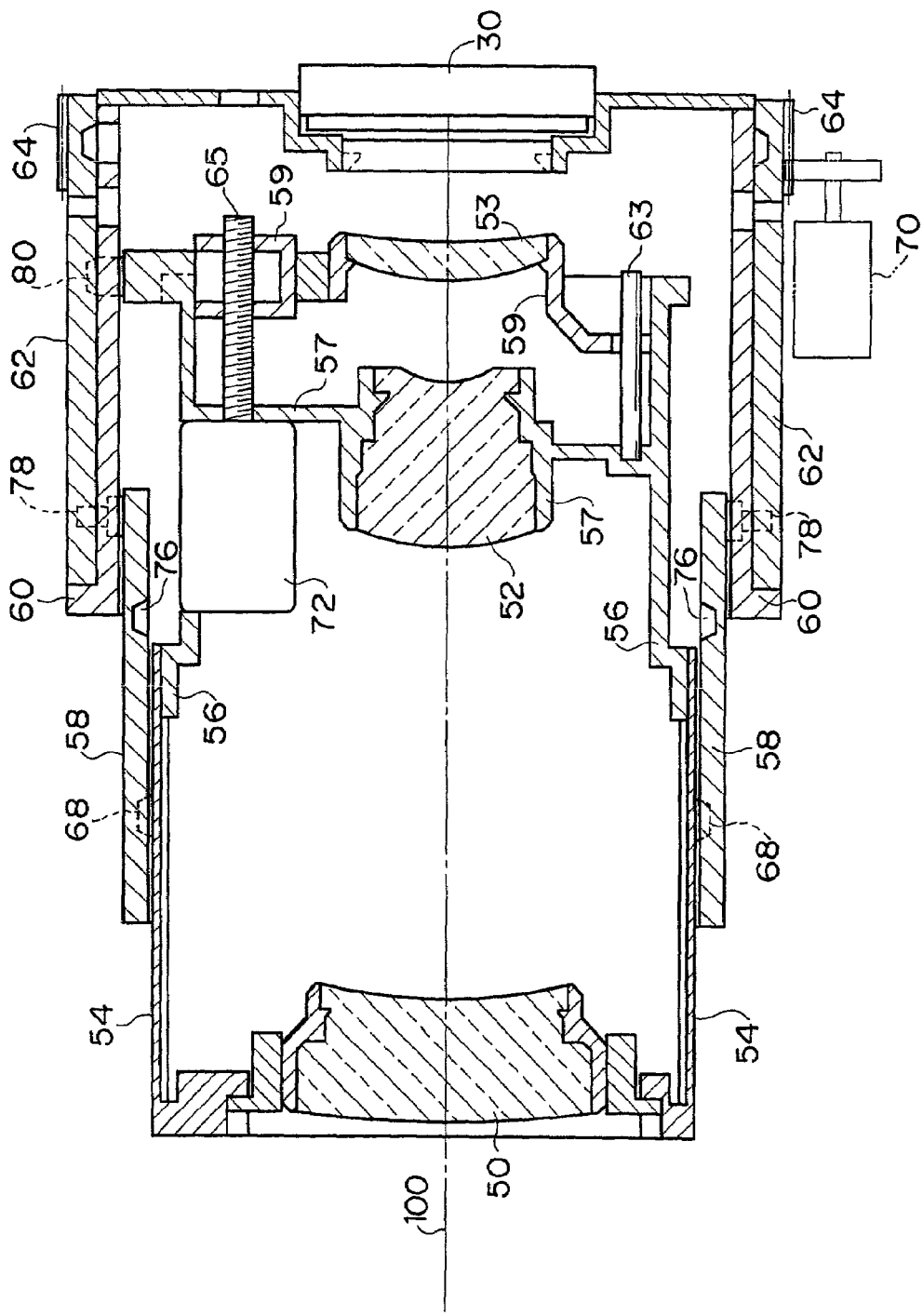
FIG. 5 is a cross-sectional view showing wide positions of the lenses in the digital camera shown in FIGS. 1A and 1B.

The rotating cylinder 62 rotates in an accommodation rotation range from an initial position to an intermediate position so as to move the zoom lens 14 from the retracted position shown in FIG. 3 to a tele (far off) position shown in FIG. 4. Further, the rotating cylinder 62 rotates in a magnification-changing rotation range from the intermediate position to an end position so as to move the zoom lens 14 from the tele position to a wide position shown in FIG. 5. The forward lens group 50, the backward lens group 52 and the focus lens 53 are moved to predetermined initialization positions.

The stepping motor 72 is driven during driving of the DC motor 70 by a predetermined drive amount every fixed period of time which is determined in advance or every predetermined fixed clock so as to move the focus lens 53 such that when the zoom lens has moved (i.e., when the lens barrel has extended to the initialization position), the focus lens 53 is disposed at the initialization position. By driving the DC motor 70 as described above, it is possible to reduce the start-up processing time which is the time from when the power source is turned on until the digital camera is in a state in which photographing is possible.

In step 210, it is determined whether the voltage when the DC motor and the stepping motor are driven simultaneously is smaller than or equal to a second predetermined value (for example, less than or equal to 2.3 V). If the voltage is smaller than or equal to the second predetermined value, the electric energy of the power source which is being currently used may be decreasing. If the DC motor and the stepping motor continue to be driven simultaneously, there are possibilities that sufficient amount of electric energy may not be obtained at a time of photographing or the motors may stop due to lack of electric energy. Thus, the process proceeds to step 215 and in step 215 the stepping motor 72 stops. Then, the process proceeds to step 222 to be described later.

If the voltage is not smaller than or equal to the second predetermined value, the electric energy of the power source which is being used at that time is sufficient. Thus, the DC motor and the stepping motor continue to be driven simultaneously. The process proceeds to the subsequent step 212 and in step 212 a determination is made as to whether the forward lens group 50, the backward lens group 52 and the focus lens 53 have reached the initialization positions. In step 212, if it is determined that the forward lens group 50, the backward lens group 52 and the focus lens 53 have not reached the initialization positions, the process returns to step 210 and the above-described processing in step 210 is repeated. If it is determined that the forward lens group 50, the backward lens group 52 and the focus lens 53 have reached the initialization positions, in step 214 the driving of the DC motor 70 and the stepping motor 72 stop and then the present routine ends.

On the other hand, in step 202, when the fetched power source voltage value is smaller than the first predetermined value, the process proceeds to step 216 and in step 216 the lens cover motor 74 is driven to open the lens cover 61. In step 218, it is determined that the amount by which the voltage decreases at that time, i.e., the amount by which the voltage is less than the power source terminal voltage value when the power source is turned on is larger than the second predetermined amount. The second predetermined amount is an amount to distinguish between the fully-charged NiMH battery 116, the alkaline battery 114 which is charged by a small amount and the NiMH battery 118 which is charged by a small amount and is preferably 0.15 V from FIG. 8, but is not limited thereto.

If the amount by which the voltage decreases is less than the second predetermined amount, it is determined that the fully-charged NiMH battery 116 is used. Then, the process proceeds to step 208 and the above-described processings are repeated. If the amount by which the voltage decreases is larger than the second predetermined amount, it is determined that the alkaline battery 114 with a small amount of charge or the NiMH battery 118 with a small amount of charge is used and the process proceeds to step 220.

In step 220, the DC motor 70 is driven to move the forward lens group 50 and the backward lens group 52. In the subsequent step 222, if it is determined that the forward lens group 50 and the backward lens group 52 have reached the predetermined initialization positions, the process proceeds to the subsequent step 224. In step 224, driving of the DC motor 70 stops and the stepping motor 72 is driven to move the focus lens 53 to the focusing position.

In step 226, a determination is made as to whether the focus lens 53 has reached the initialization position which is the focusing position and if it is determined that the focus lens 53 has reached the initialization position, in step 228, driving of the stepping motor 72 stops and the present routine ends.

In this way, in a case of a power source with a small amount of electric energy, the DC motor 70 and the stepping motor 72 are controlled to be driven sequentially. Thus a load on the power source is reduced and the digital camera 10 can be set to a state in which photographing is possible.

In the above-described first embodiment, a determination is made as to whether or not the power source voltage decreases while the DC motor 70 and the stepping motor 72 are being driven simultaneously. Then if the power source voltage decreases, the DC motor 70 and the stepping motor 72 are separately driven. Thus even if a high load is exerted when the DC motor 70 and the stepping motor 72 are driven simultaneously such the amount of electric energy used becomes large, abrupt decreases in the amount of electric energy can be avoided. It may also be structured such that a determination is not made as to whether or not the power source voltage decreases while the DC motor 70 and the stepping motor 72 are being driven simultaneously.

In the first embodiment, a determination is made as to whether or not the alternating power source is connected and the magnitude of the electric energy of the power source is determined using the amount by which the voltage decreases when the lens cover motor 74 is driven so as to control the driving of the DC motor 70 and the stepping motor 72. The present invention is not limited to the above-described structure. For example, the driving of the DC motor 70 and the stepping motor 72 may be controlled based on the amount by which the voltage decreases when the DC motor 70 which is a zoom motor is driven.

In the above-described case, for example, it may be structured such that the amount by which the voltage decreases after a predetermined time elapses since the driving of the DC motor 70 starts is used. The voltage value which varies due to the driving of the DC motor 70 is detected continuously or every time a predetermined time elapses such that the amount by which the voltage decreases with respect to a previously detected voltage or to a voltage detected in the beginning can be used. When the amount by which the voltage decreases based on the driving of the DC motor 70 is used, the present invention can be applied to a digital camera in which a lens cover which opens/closes by a driving means is not provided.

As a practical application of the present invention, a determination may be made as to whether or not the alternating voltage is connected and the magnitude of the electric energy of the power source may be determined using the amount by which the voltage decreases caused by, in addition to the lens cover motor 74 and the DC motor 70, components which are driven at first at a time of start-up so as to control the driving of the DC motor 70 and the stepping motor 72.

The digital camera 10 is structured such that either an AA battery such as an NiMH battery, an alkaline battery or the like or an alternating power source is selected as a main power source. The battery to be used is not limited to the NiMH battery or the alkaline battery. Although the AA battery is used as the alkaline battery, batteries other than the AA battery can be used.

In the first embodiment, a zoom lens consisting of two groups is used, but the present invention is not limited to this zoom lens and the zoom lens may include three groups or more. The present invention can be applied not only to a zoom lens camera but also to a two-focus camera in which switching between a tele position, a wide position and a retracted position is carried out. Further, although the tele position is set between the retracted position and the wide position, the wide position can be set between the retracted position and the tele position.

Second Embodiment

A second embodiment of the present invention will be described hereinafter with reference to FIGS. 9A and 9B. The second embodiment is the same as the first embodiment except that control by the CPU 22a at a time of start-up is different. Thus only the control by the CPU 22a at a time of start-up will be described and other descriptions will be omitted. The steps in FIGS. 9A and 9B which are the same as in FIGS. 7A and 7B are denoted by the same reference numerals and descriptions thereof will be omitted, only portions that differ will be described.

Figure 9A:
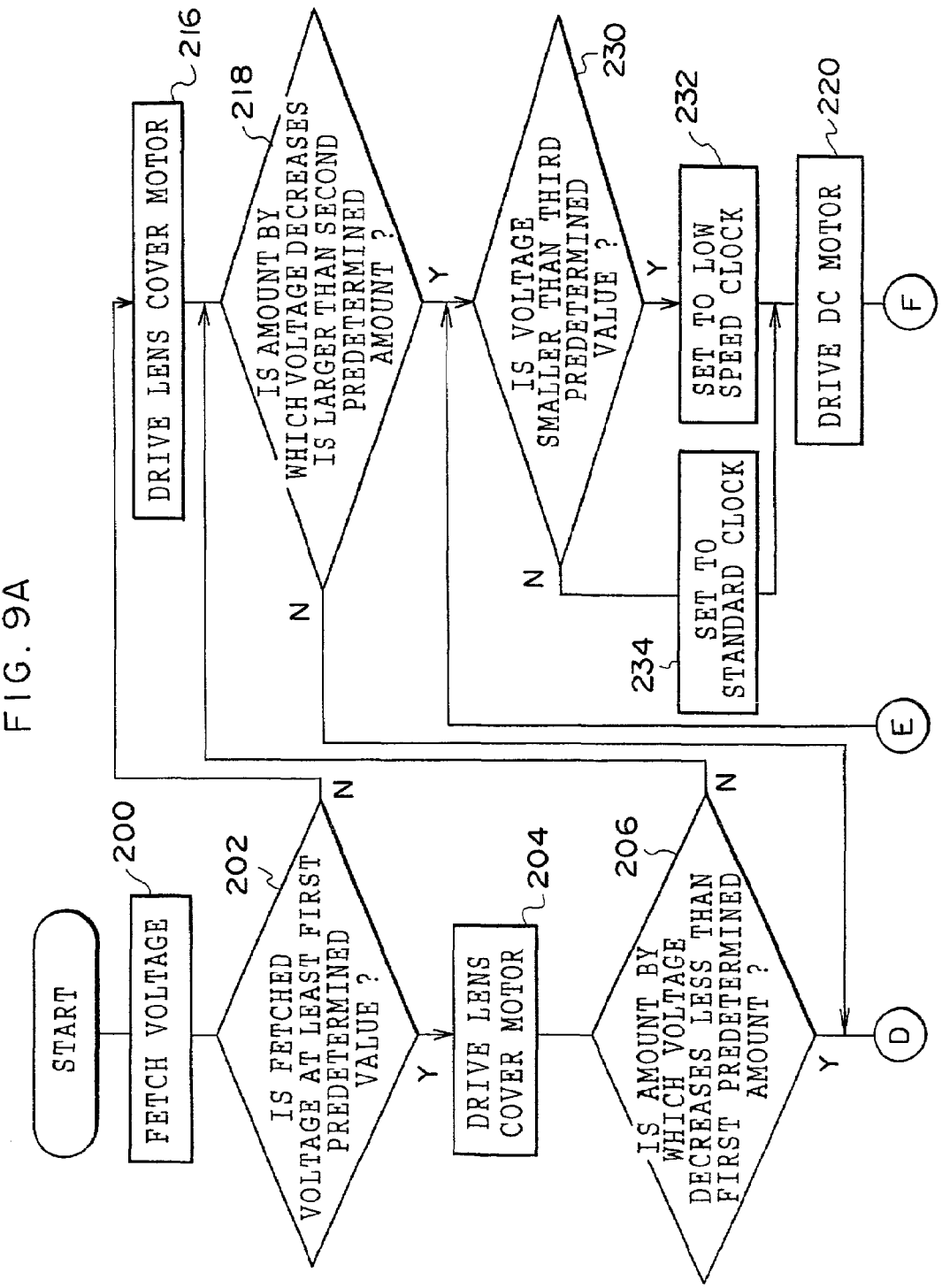

The stepping motor 72 stops in step 215 in FIGS. 9A and 9B. Then, the process proceeds to step 230. In step 218 in FIGS. 9A and 9B, if an amount by which the voltage decreases at a time of driving the lens cover motor 74 is larger than the second predetermined amount, the process proceeds to step 230.

In step 230, a determination is made as to whether or not the voltage value when driving the lens cover motor 74 is smaller than a predetermined third value. The third predetermined value is an upper limit of the amount of electric energy which is insufficient if the DC motor 70 is driven at a standard clock (for example, 100 MHz), but sufficient to drive the DC motor 70 if the DC motor 70 is driven at a low speed clock (for example, 50 MHz). Setting of the standard clock or the low speed clock can be appropriately changed in accordance with specifications. Further, a plurality of low speed clocks may be set. In this case, smaller the electric energy becomes, slower the start-up processing becomes. Moreover, the electric energy of the power source is determined and if the electric energy is less than a predetermined amount, a lower clock frequency than the standard clock frequency of a CPU, a photographing system or a signal processing system, may be set.

In step 230, if the voltage value at a time of driving the lens cover motor 74 is smaller than the third predetermined value, the process proceeds to step 232. In step 232, a clock is set to a low speed clock. Then, in step 220, the DC motor is driven. On the other hand, in step 230, the voltage value when driving the lens cover motor 74 is larger than the third predetermined value, the process proceeds to step 234 and in step 234 a clock is set to a standard clock. Then, in step 220 the DC motor is driven.

As described above, in the second embodiment, a clock frequency is changed in accordance with the electric energy of the power source. Thus, the present invention has an effect in which batteries with low electric energy are effectively used so as not to waste the electric energy.

As described above, the digital camera according to the first aspect of the present invention has an effect in which when the power source which is being used is a power source with a large amount of electric energy, the zoom motor and the focus motor are driven simultaneously so as to reduce the start-up time.

In accordance with the second aspect of the present invention, an effect can be obtained in which when the power source which is being used is a power source with a small amount of electric energy, the zoom motor is driven to move the zoom lens to the initialization position and then the focus motor is moved, thus energy in a battery can be used with little waste.

Further, in accordance with the third aspect through the fifth aspect of the present invention, an effect can be obtained in which when the power source which is being used is an alternating power source, the zoom motor and the focus motor are driven simultaneously so as to reduce the start-up time.

Particularly, in accordance with the fifth aspect of the present invention, an effect can be obtained in which since a determination as to whether or not the alternating power source is connected is made on the basis of the voltage value when the power source is turned on and the amount by which the voltage decreases, it is not necessary to add a device for determining whether or not the alternating power source is connected, resulting in a simpler structure.

In accordance with the sixth and seventh aspects of the present invention, an effect in which a battery can be fully used without wasting energy can be obtained.

What is claimed is:

1. A digital camera comprising:
   (a) a housing having a lens barrel movable along an optical axis;
   (b) a zoom lens group and a focus lens group movable relative to one another along the optical axis in the lens barrel;
   (c) a zoom motor connected to the lens barrel operable for moving the lens barrel to a position corresponding to a selected magnification;
   (d) a focus motor connected to the focus lens group operable for moving the focus lens group to a focus position corresponding to the selected magnification;
   (e) a lens cover movable between closed and open positions for protecting at least one lens, and a lens cover driving motor connected to the lens cover, operable for moving the lens cover between closed and open positions;
   (f) an electric power source;
   (g) a controller connected to the electric power source and controlling the zoom motor and the focus motor, the controller determining during power initiation whether an amount of voltage decrease from the electric power source terminal voltage value caused by an operation of one of the lens cover driving motor and the zoom motor is less than a predetermined decrease amount value, and if so, controlling the zoom motor and the focus motor to substantially overlap in operation to move the lens groups to initialization positions; and
   (h) an image sensor supported in the housing for receiving light through the lens groups, and operable for producing data in correspondence with light received through the lens groups for image recording,
   wherein the amount of voltage decrease corresponds with a difference voltage between a first power source voltage level at a start of power initiation and a second power source voltage level during power initiation.

2. The digital camera according to claim 1, wherein if said voltage decrease is greater than the predetermined value, said controller drives one of said zoom motor and said focus motor to move one of said zoom lens group and said focus lens group to an initialization position, and then drives the other motor to move the other lens group to an initialization position.

3. The digital camera according to claim 2, wherein when said voltage decrease is greater than the predetermined value, said controller drives said zoom motor to move said zoom lens group to an initialization position, and then drives said focus motor to move said focus lens group to an initialization position.

4. The digital camera according to claim 1, wherein said controller includes a clock, the controller determining electric energy availability of the power source on the basis of at least one of a power source voltage value during power initiation and the voltage decrease when one of the lens cover driving motor and said zoom motor is driven, and when the electric energy energy availability is less than a predetermined amount, sets a lower clock frequency for the clock.

5. A method for activating a digital camera having a zoom and focus lens group respectively driven by a zoom and focus motor, a lens cover driven by a lens cover driving motor, and a power source, the method comprising:
   (a) determining a power source voltage available upon power initiation prior to driving any of the motors;
   (b) operating at least one of the lens cover driving motor and the zoom motor during power initiation, and determining an amount of power source voltage decrease from a terminal voltage value caused by the operation; and
   (c) substantially overlapping operation of the zoom and focus motors to drive the zoom and focus lens group to initialization positions if the amount of power source voltage decrease is less than a predetermined decrease amount value,
   wherein the amount of power source voltage decrease corresponds with a difference voltage between a first power source voltage level at a start of power initiation and a second power source voltage level during power initiation.

6. The method of claim 5, further comprising operating one of said zoom motor and said focus motor so as to move one of said lens groups to an initialization position when said power source voltage decrease is greater than a predetermined value, and then operating the other motor so as to move the other lens group to an initialization position.

7. The method of claim 6, wherein said zoom motor is operated so as to move said zoom lens group to an initialization position when said power source voltage decreases is larger than the predetermined value, and then operating said focus motor so as to move said focus lens group to an initialization position.

8. The method of claim 6, wherein the digital camera includes a clock, further comprising:
   determining an amount of electric energy available from the power source on the basis of at least one of a power source voltage value upon power initiation and the power source voltage decrease; and
   setting a lower frequency for the clock in the amount of electric energy determined to be available is less than a predetermined amount.

9. The method of claim 5, further comprising ceasing operation of said focus motor when said power source voltage is less than a predetermined value when said zoom motor and said focus motor are being operated simultaneously.

10. The method of claim 5, further comprising:
determining whether the power source is connected to an alternating power source upon power initiation; and
substantially overlapping operation of said zoom motor and said focus motor so as to move said zoom lens group and said focus lens group to initialization positions if the power source is connected to an alternative power source.

11. The method of claim 10, wherein determining whether the power source is connected to an alternating power source is determined on the basis of the power source voltage available upon power initiation and the amount of power source voltage decrease when one of said lens cover driving motor and said zoom motor is driven.

12. The method of claim 10, wherein the power source is determined to be connected to the alternating power source if the power source voltage is at least 2.9 V.

13. The method of claim 10, wherein the digital camera includes a clock, further comprising:
determining an amount of electric energy available from the power source on the basis of at least one of a power source voltage value upon power initiation and the power source voltage decrease; and
setting a lower frequency for the clock if the amount of electric energy determined to be available is less than a predetermined amount.

14. The method of claim 5, wherein the digital camera includes a clock, further comprising:
determining an amount of electric energy available from the power source on the basis of at least one of a power source voltage value upon power initiation and the power source voltage decrease; and
setting a lower frequency for the clock if the amount of electric energy determined to be available is less than a predetermined amount.

* * * * *